Dec. 6, 1966 R. E. PRESCOTT ETAL 3,290,429

ARMORED ELECTRIC LINE

Filed Aug. 4, 1964 2 Sheets-Sheet 1

INVENTORS R. E. PRESCOTT
L. N. WILDER
BY E J Oluider
ATTORNEY

Dec. 6, 1966 R. E. PRESCOTT ET AL 3,290,429

ARMORED ELECTRIC LINE

Filed Aug. 4, 1964 2 Sheets-Sheet 2

United States Patent Office 3,290,429

Patented Dec. 6, 1966

3,290,429

ARMORED ELECTRIC LINE

Robert E. Prescott, Rumson, N.J., and Leslie N. Wilder, Fullerton, Calif., assignors to Bell Telephone Laboratories Incorporated, New York, N.Y., a corporation of New York Filed Aug. 4, 1964, Ser. No. 387,275

6 Claims. (Cl. 174—102)

This invention relates to armored electric lines and particularly to telephone handset cords that connect telephone handsets to housings of public coin telephones.

Handset cords in public coin telephones have in the past been protected by armoring the cord with helically wound metal having adjacent interlocking helices, similar to "BX" or "Greenfield" armor.

Unfortunately, such armored cords, among other disadvantages, are stiff. Thus, they tend to pull on the hand of the customer holding the handset, thereby adding substantially to its apparent "weight." They also drape poorly because they can bend only over large radii. Nevertheless, the effect of stiffness was minimized as long as the switchhooks upon which the handsets are mounted were located substantially out of sight at the left side of the telephone housing. However, this position predisposes a customer to hold the handset in his left hand against his left ear. To accommodate those customers who wish to hold the telephone handset in the right hand, symmetrical housings have been developed with switchhooks projecting from a front panel above the dial. Such structures are particularly convenient for corner-mounted housing wherein a single front panel extends from one wall to an adjacent transverse wall. With such panels there is no side from which the switchhook can project.

Placing a telephone handset that connects to a housing whose switchhook is center mounted results in the stiff armor of the cord shifting the handset angularly from the switchhook because such a cord can only drape over large radii. The askew position of the telephone handset is unsightly and may under certain exaggerated situations cause an "off-hook" condition. The cord may also push the lower transmitter portion of the handset outwardly from the telephone housing and into the path of passers-by who may accidentally knock the handset from the switchhook.

A general object of the present invention is to improve armored electrical conductors. Another more particular object is to improve telephone handset cords.

Still another object of the invention is to render such cords more flexible than hitherto possible and at the same time increase their protecting properties.

Yet another object of the present invention is to connect a telephone handset with a coin telephone housing by a telephone cord which drapes limply so as not to displace the handset from its normal vertical position when on the hook.

The present invention accomplishes these objects by surrounding insulated interior conductors, such as telephone handset conductors, with a plurality of discontinuous but interlinking, longitudinally displaced, coaxial, and open segments which permit a limited degree of mutual longitudinal movement and substantial angular departure from the axes of adjacent segments. This allows the resulting structure to drape loosely and turn about comparatively small radii. The invention is based upon the recognition that disadvantages such as the stiffness of previous armored cords were imparted to the cord by a property of its armor, namely, its continuity. This continuity is avoided by the present invention.

More specifically, according to the invention a telephone handset is connected to a telephone housing by a multiconductor cord which is armored by surrounding the conductors with a number of small armoring sleeves alternating longitudinally with larger diameter armoring sleeves, and by linking the smaller sleeves to the larger sleeves with outwardly extending flanges on the ends of the smaller sleeves that fit behind inwardly extending flanges at the edges of the larger sleeves.

As a more specific aspect of the invention, the twisting action which such independent segments allow by virtue of their mutual rotatability is inhibited by mating the linking elements with the members; for example, by forming the smaller sleeves into noncircular members and conforming the inner openings of the inwardly directed flanges on the larger sleeves to this noncircular shape. This will limit such undesirable twistability.

The features of novelty characterizing the invention are pointed out in the claims forming part of this specification. Other objects and advantages of the invention will become obvious from the following detailed description when read in light of the accompanying drawing, wherein:

Figure 1:
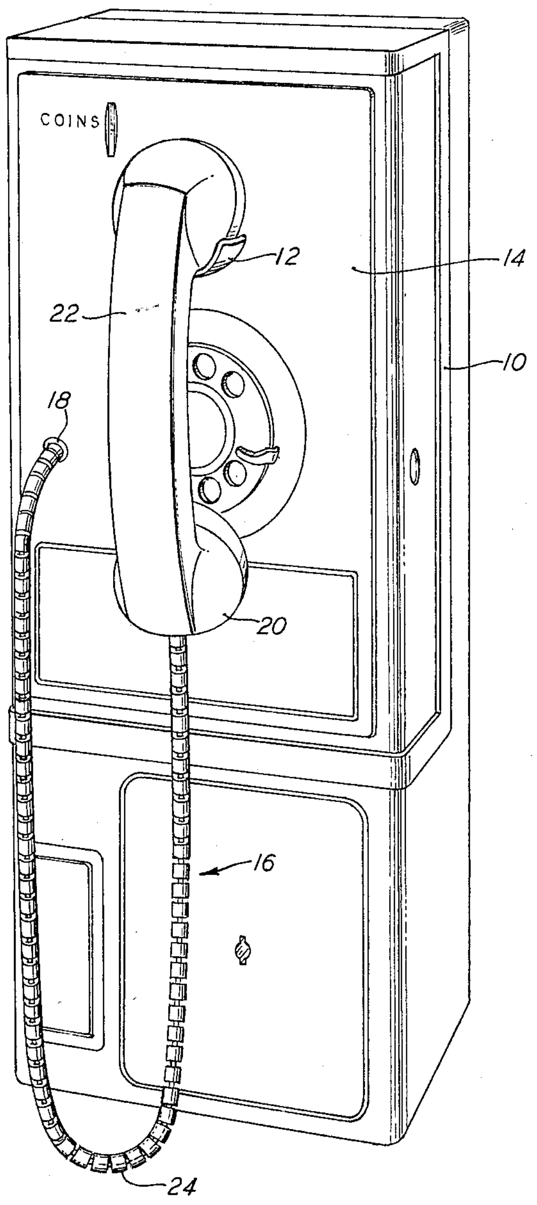
FIG. 1 is a perspective view of a coin telephone showing a cord according to the invention and connecting a handset to a housing.

In FIG. 1 a housing 10 for a coin telephone supports a switchhook 12 which is centrally located on a front panel 14 of the housing. The housing 10 receives a handset cord 16 extending from an opening 18 in the housing to the lower transmitter end 20 of a handset 22. The structure of the handset cord 16 is sufficiently limp for the cord to drape down vertically through a comparatively small loop 24 and extend vertically upward.

Figure 2:
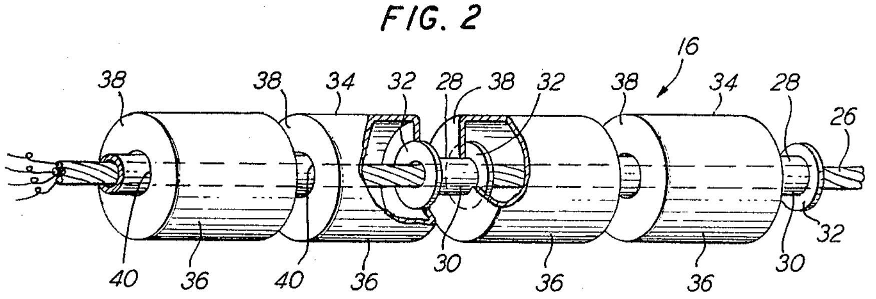
FIG. 2 is a detailed partially broken away view of a portion of a handset cord embodying features of the invention.
Figure 3:
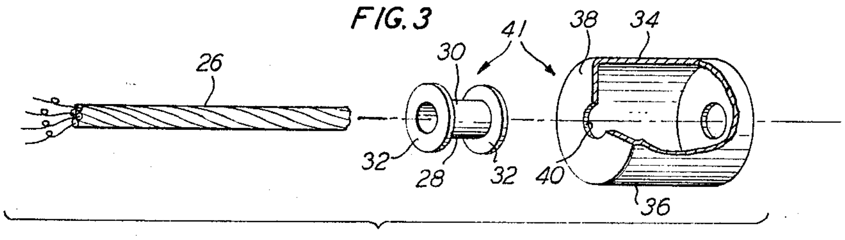
FIG. 3 is an exploded view of some of the members in the cord of FIG. 2.

As seen from FIGS. 2 and 3, the cord 16 comprises a plurality of insulated intertwisted interior conductors 26 for carrying electrical signals between the housing 10 and the handset 22. Surrounding the conductors 26 at spaced longitudinal locations are a number of spaced spool-shaped metal sleeves 28, each possessing a cylindrical member or duct 30 between integral, outwardly directed, annular, flange members 32. Embracing adjacent flange members 32 on adjacent sleeves 28 are a plurality of drum-shaped metal armor elements 34 each composed of a shell 36 between two inwardly extending annular flanges 38 whose center openings 40 are smaller than the diameter of the flanges 32 but larger than the diameter of the cylinder ducts 30. The elements 34 and sleeves 28 are thus linked. The inner diameter of each shell 36 exceeds the outer diameter of the flange member 32. The metal of the sleeves 28 and elements 34 is sufficiently thick to prevent penetration by sharp objects. Sufficient clearance exists between the openings 40 and the cylindrical members 30 to allow considerable deviation of the axis in each drum-shaped armor element 34 from the axes of the adjacent sleeves 28 and thereby produce a comparatively limp cord. The sleeves and elements form an armor 41 that embraces the conductor 26.

The armor 41 is capable of contracting longitudinally until the outer faces of the flanges 38 on the armor elements 34 meet with the outer faces on the flanges 38 of the adjacent elements 34. The armor is extensible longitudinally until the inner faces of the flanges 38 on each element 34 strike the inner faces of the closest flange member 32 on the sleeves 28.

In use the overall length of the armor 41 of the cord 16 is extended to an approximate intermediate condition between the two extreme longitudinal positions above described. The cord is secured to the opening 18 on the housing 10 by the armor 41, hangs limply as shown in FIG. 1 to form loop 24, and is secured to the transmitter end 20 on the handset 22 by the armor 41. The interior conductors 26 pass through the armor 41 from inside the housing 10 into the handset 22.

Figure 4:
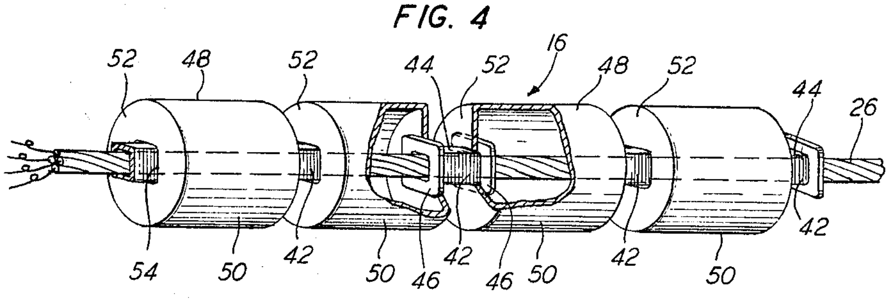
FIG. 4 is a partially broken away view of a portion of another handset cord according to the invention.
Figure 5:
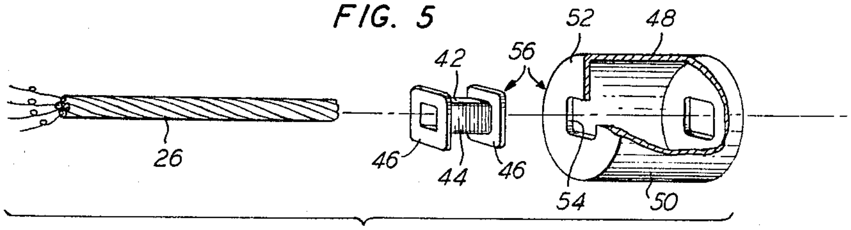
FIG. 5 is an exploded view of some of the members in the cord of FIG. 4.

FIGS. 4 and 5 illustrate another embodiment of the cord 16. Here the intertwisted conductors 26 of the cord 16 pass through a number of spaced metal rectangular spools 42, each composed of hollow rectangular ducts 44 between integral end flanges 46, also of rectangular shape and directed outwardly. Embracing adjacent end flanges 46 on adjacent rectangular spools 42 are a plurality of drum-shaped armor elements 48 of armoring metal, each composed of sleeves 50 of a diameter larger than the flanges 46 between two inwardly directed end flanges 52. The sleeves 50 have circular cross-section, but other shapes may be used. Formed in the center of flanges 52 are rectangular openings 54 conforming substantially to the shape of the outside of the ducts 44 but large enough to permit free longitudinal movement along the outside of duct 44. The openings 54 are also sufficiently large to allow considerable deviation of the axes of armor elements 48 from the axes of the rectangular spools 42. The clearance between the openings 54 and the ducts 44 allows very limited mutual rotation between the rectangular spools 42 and the armor elements 48 so that the armor is substantially incapable of being twisted. The spools 42 and elements 48 from a linked armor 56 which protects the conductors 26.

In use, the armor 56 is extensible to limits determined by the lengths of the ducts 44 and the lengths of the cylindrical sleeves 50. It may be compressed longitudinally until the outer faces of flanges 52 meet with the outer faces of adjacent flanges 52. The overall length of the armor 56 surrounding the twisted conductors 26 to form cord 16 is extended approximately between these two extreme limits and secured rotationally and translationally in the opening 18 of the housing 10 in FIG. 1, as well as in the opening at the transmitter end 20 of the handset 22. In this configuration it hangs limply as shown in FIG. 1. Twisting of the cord 16 by turning of the handset 22 is substantially limited. Turning of the handset 22 without twisting the cord 16 can be made possible by securing the cord 16 to the housing 10 at the opening 18 with a rotating bearing holding the armor and commutating members for connecting the conductors 26.

The cord 16 substantially alleviates many problems of helically armored cords. The cord 16 is substantially as limp as permitted by the stiffness of the conductors 26 and the clearances between the flanges 52 and the ducts 44. The sleeves 28, elements 34, spools 42, and elements 48 are each made of comparatively thick resistant metal, such as .022 inch thick stainless steel, which need have little flexibility as compared to present helical armor. Thus, the likelihood of penetration of the armor by an instrument is considerably reduced.

In one embodiment, the elements 48 had an outside diameter of 5⁄16 inch and the armor 41 had a minimum bend radius of 1½ inches.

While several embodiments of the invention have been described in detail, it will be obvious to those skilled in the art that the invention may be embodied otherwise without departing from its spirit and scope.

What is claimed is:

1. An armored electric line comprising conductor means, a plurality of independent and separate sleeve-like armor means each surrounding said conductor means, said armor means each being longitudinally distributed along said conductor means, and means on each of said armor means for linking one armor means to another to form an interlinked sequence of armor means, said linking means on each of said armor means being joined to said armor means and being rotationally fixed relative to said armor means, each of said sleeve-like armor means forming with said linking means thereon a structure longitudinally movable relative to an adjacent armor means.

2. An armored electric line comprising conductor means, a plurality of independent and separate sleeve-like armor means each surrounding said conductor means, said armor means each being longitudinally distributed along said conductor means, and means on each of said armor means for linking one armor means to another to form an interlinked sequence of armor means, said linking means on each of said armor means being joined to said armor means and being rotationally fixed relative to said armor means, each of said sleeve-like armor means forming with said linking means thereon a structure longitudinally movable relative to an adjacent armor means, and keying means on said armor means for limiting the relative rotational movement of said armor means.

3. A telephone handset cord comprising an insulated interior line, a plurality of longitudinally spaced outer sleeves surrounding said line and having at each end of each sleeve integral inwardly directed flanges forming respective openings, a plurality of longitudinally spaced inner sleeves each extending through the openings in the flanges on adjacent outer sleeves, outwardly extending flanges at the ends of each of said inner sleeves extending into the interior of said outer sleeves and interlocking with the inwardly extending flanges, each of said inner and outer sleeves forming with said flanges thereon an integral structure longitudinally movable relative to an adjacent sleeve along a substantial longitudinal portion of the adjacent sleeve

4. A telephone handset cord comprising an insulated interior line, a plurality of longitudinally spaced outer sleeves surrounding said line and having at each end of each sleeve inwardly directed flanges forming respective openings, a plurality of longitudinally spaced inner sleeves each extending through the openings in the flanges on adjacent outer sleeves, outwardly extending flanges at the ends of each of said inner sleeves extending into the interior of said outer sleeves and interlocking with the inwardly extending flanges, each of said sleeves being longitudinally movable relative to an adjacent sleeve along a substantially longitudinal portion of said adjacent sleeve, said inner sleeve and the opening in said inwardly directed flanges each having a shape of varying diameter so as to limit relative rotation between them, each of said sleeves forming with its flanges an integrally joined unit so that each sleeve and its flanges are fixed relative to each other.

5. A telephone handset cord comprising an insulated interior line, a plurality of longitudinally spaced outer sleeves surrounding said line and having at each end of each sleeve inwardly directed flanges forming respective openings, a plurality of longitudinally spaced inner sleeves each extending through and mating with the openings in the flanges on adjacent outer sleeves, and outwardly extending flanges at the ends of each of said inner sleeves extending into the interior of said outer sleeves and interlocking with the inwardly extending flanges, said sleeves each being longitudinally movable relative to an adjacent sleeve along a substantial longitudinal portion of said adjacent sleeve, said inner sleeve and the opening in said inwardly directed flanges each having a shape of varying diameter so as to limit relative rotation between them, each of said sleeves forming with its flanges an integrally joined unit so that each sleeve and its flanges are fixed relative to each other.

6. An armored electric line as in claim 1 wherein said independent armor means are rotatable relative to each other.

References Cited by the Examiner

UNITED STATES PATENTS

| | | | |
|---|---|---|---|
| 1,276,117 | 8/1918 | Riebe | 59—78.1 |
| 1,478,009 | 12/1923 | Herskovitz | 59—78.1 |
| 2,164,168 | 5/1935 | Wertzheiser et al. | 174—109 |
| 2,136,770 | 3/1936 | Witzenmann | 138—120 X |
| 2,169,108 | 8/1939 | Meybauer | 174—28 X |
| 2,442,623 | 6/1948 | Sziklai | 174—28 |

FOREIGN PATENTS

| | | |
|---|---|---|
| 604,542 | 10/1934 | Germany. |

References Cited by the Applicant

UNITED STATES PATENTS

| | | |
|---|---|---|
| 272,774 | 2/1883 | Rittenhouse. |
| 391,883 | 10/1888 | Cottle. |
| 1,515,499 | 11/1924 | Lederer. |
| 1,947,113 | 2/1934 | Russell. |
| 2,856,752 | 10/1958 | Bahr. |

LEWIS . MYERS, *Primary Examiner.*

ROBERT K. SCHAEFER, LARAMIE E. ASKIN, *Examiners.*

H. HUBERFELD, *Assistant Examiner.*